(12) United States Patent
McCluskey et al.

(10) Patent No.: US 12,543,980 B2
(45) Date of Patent: Feb. 10, 2026

(54) DETERMINING A PLATELET AGGREGATION VALUE

(71) Applicant: Instrumentation Laboratory Company, Bedford, MA (US)

(72) Inventors: Cory Lee McCluskey, Encinitas, CA (US); Robert S. Hillman, San Diego, CA (US)

(73) Assignee: Instrumentation Laboratory Company, Bedford, MA (US)

( * ) Notice: Subject to any disclaimer, the term of this patent is extended or adjusted under 35 U.S.C. 154(b) by 996 days.

(21) Appl. No.: 17/352,550

(22) Filed: Jun. 21, 2021

(65) Prior Publication Data

US 2022/0400983 A1 Dec. 22, 2022

(51) Int. Cl.
*A61B 5/1455* (2006.01)
*A61B 5/1459* (2006.01)
*G01N 21/49* (2006.01)

(52) U.S. Cl.
CPC ........... *A61B 5/1459* (2013.01); *G01N 21/49* (2013.01)

(58) Field of Classification Search
CPC .................................................. A61B 5/1455
See application file for complete search history.

(56) References Cited

U.S. PATENT DOCUMENTS

| | | | |
|---|---|---|---|
| 4,854,170 A | 8/1989 | Brimhall et al. | |
| 5,763,199 A | 6/1998 | Coller | |
| 5,907,399 A * | 5/1999 | Shirasawa | G01N 15/0205 356/336 |
| 5,922,551 A | 7/1999 | Durbin et al. | |
| 6,043,871 A * | 3/2000 | Solen | G01N 33/4905 356/427 |
| 7,972,861 B2 | 7/2011 | Deng et al. | |
| 2003/0030783 A1* | 2/2003 | Roche | G01N 15/1459 356/436 |
| 2015/0050677 A1 | 2/2015 | Rade | |
| 2017/0122930 A1* | 5/2017 | Nadkarni | G01N 33/4905 |

FOREIGN PATENT DOCUMENTS

| | | |
|---|---|---|
| EP | 0653068 B1 | 1/2000 |
| WO | 1996032883 A1 | 10/1996 |
| WO | 9914595 A1 | 3/1999 |
| WO | 00/25140 | 5/2000 |
| WO | 2011101815 A1 | 8/2011 |

OTHER PUBLICATIONS

Extended European Search Report for European Application No. 22176872.4, issued Oct. 20, 2022, (11 pages).

(Continued)

*Primary Examiner* — Marjan Fardanesh
(74) *Attorney, Agent, or Firm* — ArentFox Schiff LLP

(57) ABSTRACT

An example system includes a chamber to hold a mixture that includes a whole blood sample from a patient, a light source to illuminate the mixture in the chamber, a detector to detect light from the light source transmitted through the mixture in the chamber, and one or more processing devices to determine, based on the light detected by the detector, a platelet aggregation value of the whole blood sample that is substantially independent of a hematocrit of the whole blood sample.

17 Claims, 12 Drawing Sheets

(56) References Cited

OTHER PUBLICATIONS

Johanne Silvain et al.: "Impact of red blood cell transfusion on platelet activation and aggregation in healthy volunteers: results of the Transfusion study", European Heart Journal, vol. 31, No. 22, Jun. 29, 2010 (Jul. 29, 2010), pp. 2816-2821, XP055969896, GB ISSN: 0195-668X, DOI: 10.1093/eurheartj/ehq209.
Jessica Le Blanc et al.: "Advances in Platelet Function Testing-Light Transmission Aggregometry and Beyond", Journal of Clinical Medicine, vol. 9, No. 8, Aug. 13, 2020 (Aug. 13, 2020), p. 2636, XP055871250, DOI: 10.3390/jcm9082636.
Communication pursuant to Article 94(3) EPC in Application No. 22176872.4 dated Jun. 3, 2024, 7 pages.
Accumetrics, Inc., "VerifyNow System User Manual," Document No. 14340.J, Jan. 2006, (138 pages).
Kim YG, Suh JW, Sibbing D, Kastrati A, Ko YG, Jang Y, Cho YS, Youn TJ, Chae IH, Choi DJ, Kim HS. A laboratory association between hemoglobin and VerifyNow P2Y12 reaction unit: A systematic review and meta-analysis. Am Heart J. Jun. 2017; 188:53-64.
Swaim L, Hillman RS. Aspirin administered to women at 100 mg every other day produces less platelet inhibition than aspirin administered at 81 mg per day: implications for interpreting the women's health study. J Thromb Thrombolysis. Jul. 28, 2009(1):94-100.
Kakouros N, Kickler TS, Laws KM, Rade JJ. Hematocrit alters VerifyNow P2Y12 assay results independently of intrinsic platelet reactivity and clopidogrel responsiveness. J Thromb Haemost. Oct. 2013; 11(10):1814-22.

\* cited by examiner

DETERMINING A PLATELET AGGREGATION VALUE

TECHNICAL FIELD

This specification relates generally to example processes for determining, for a whole blood sample, a platelet aggregation value that is substantially independent of a hematocrit of the whole blood sample.

BACKGROUND

Whole blood includes plasma, red blood cells, white blood cells, and platelets. Platelets cause whole blood to clot. More specifically, activation of the platelets is part of a process that results in clotting. A platelet aggregation test determines how well platelets aggregate. A platelet aggregation value produced by a platelet aggregation test is a measure of how well the platelets aggregate.

SUMMARY

An example system includes a chamber to hold a mixture that includes a whole blood sample from a patient, a light source to illuminate the mixture in the chamber, a detector to detect light from the light source transmitted through the mixture in the chamber, and one or more processing devices to determine, based on the light detected by the detector, a platelet aggregation value of the whole blood sample that is substantially independent of a hematocrit of the whole blood sample. The example system may include one or more of the following features, alone or in combination.

Determining the platelet aggregation value may include determining an initial platelet aggregation value of the whole blood sample based on the light detected, and adjusting the initial platelet aggregation value based on a hematocrit-based correction value to produce the platelet aggregation value. Adjusting the initial platelet aggregation value may include detecting a hematocrit or hematocrit-related value associated with the whole blood sample, determining the hematocrit-based correction value based on the hematocrit or hematocrit-related value, where the hematocrit-based correction value corrects for hematocrit dependence of the initial platelet aggregation value, and applying the hematocrit-based correction value to the initial platelet aggregation value, The system may include computer memory storing hematocrit-based correction values corresponding to hematocrit. Each hematocrit-based correction value may be based on measurements of the hematocrit or hematocrit-related value obtained from a same sample in a same chamber.

Determining the platelet aggregation value may include calculating the platelet aggregation value based on an attenuation of the light transmitted through the mixture in the chamber and a concentration of particles in the whole blood sample. The attenuation of the light may be based on a maximum amount of light that could be transmitted through the chamber, an amount of light transmitted through the mixture in the chamber at predefined platelet aggregation, and an amount of light transmitted through the mixture in the chamber prior to platelet aggregation. The predefined platelet aggregation may include maximum platelet aggregation.

A relationship between platelet aggregation and hematocrit is a non-linear relationship. Calculating the platelet aggregation value may be based on the non-linear relationship between the hematocrit of the whole blood sample and the platelet aggregation value of the whole blood sample. Calculating the platelet aggregation value may be based on the Beer-Lambert law.

The system may include a cartridge having multiple chambers each to hold a mixture including a portion of the whole blood sample, where the chamber is one of the multiple chambers, and multiple light sources each associated with one of the multiple chambers, where each light source is to illuminate a mixture in a respective chamber that is based on the portion of the whole blood sample in the respective chamber, and where the light source is one of the multiple light sources. The system may include multiple detectors each associated with one of the multiple chambers, where each detector is to detect light from a light source transmitted through a mixture in a respective chamber, where the detector is one of the detectors. The one or more processing devices may be configured to determine, based on light detected by each of the multiple detectors, a platelet aggregation value for each portion of the whole blood sample that is substantially independent of a hematocrit of the whole blood sample.

The one or more processing devices may be configured to control the multiple light sources to illuminate in an order such that a single chamber is illuminated at a time. The system may include a needle having a dual lumen to puncture a sample tube, where each lumen is along a fluid path in a cartridge containing the chamber.

Determining a platelet aggregation value for each portion of the whole blood sample may include determining an initial platelet aggregation value of each portion of the whole blood sample based on light detected, and adjusting the initial platelet aggregation value based on a hematocrit-based correction value to produce the platelet aggregation value. Adjusting the initial platelet aggregation value may include determining a hematocrit or hematocrit-related value associated with each portion of the whole blood sample based on light detected, determining the hematocrit-based correction value based on the hematocrit or hematocrit-related value, where the hematocrit-based correction value is for correcting for hematocrit dependence of the initial platelet aggregation value, and applying the hematocrit-based correction value to the initial platelet aggregation value.

An example method performed on a test instrument includes determining, based on a whole blood sample in a chamber, a platelet aggregation value based on the whole blood sample that is substantially independent of a hematocrit of the whole blood sample, and reporting the platelet aggregation value. The method may include one or more of the following features, either alone or in combination.

Determining the platelet aggregation value may include determining an initial platelet aggregation value of the whole blood sample based on the light detected, and adjusting the initial platelet aggregation value based on a hematocrit-based correction value to produce the platelet aggregation value. Adjusting the initial platelet aggregation value may include determining a hematocrit or hematocrit-related value associated with the whole blood sample, determining the hematocrit-based correction value based on the hematocrit or hematocrit-related value, where the hematocrit-based correction value is for correcting for hematocrit dependence of the initial platelet aggregation value, and applying the hematocrit-based correction value to the initial platelet aggregation value.

Determining the platelet aggregation value may include calculating the platelet aggregation value based on an attenuation of the light transmitted through a mixture including the whole blood sample in the chamber and a concentration of particles in the whole blood sample. A relationship between platelet aggregation and hematocrit is a non-linear relationship. Calculating the platelet aggregation value may be based on the non-linear relationship between a hematocrit of the whole blood sample in the chamber and the platelet aggregation value of the whole blood sample in the chamber. Calculating the platelet aggregation value may be based on the Beer-Lambert law.

An example system includes a cartridge having multiple chambers, each of which is for holding a mixture that includes a whole blood sample to be tested for platelet aggregation. There is a non-linear relationship between platelet aggregation values and hematocrit. The system includes means for determining, based on a mixture comprising a whole blood sample in a chamber, a platelet aggregation value for the whole blood sample that is substantially independent of a hematocrit of the whole blood sample.

Any two or more of the features described in this specification, including in this summary section, can be combined to form implementations not specifically described herein.

The systems and techniques described herein, or portions thereof, can be implemented using, or controlled by, a computer program product that includes instructions that are stored on one or more non-transitory machine-readable storage media, and that are executable on one or more processing devices to execute at least some of the operations described herein. The systems and techniques described herein, or portions thereof, can be implemented as an apparatus, method, or electronic system that can include one or more processing devices and memory to store executable instructions to implement various operations. The systems, techniques, components, structures and variations thereof described herein may be configured, for example, through design, construction, size, shape, arrangement, placement, programming, operation, activation, deactivation, and/or control.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Figure 1:
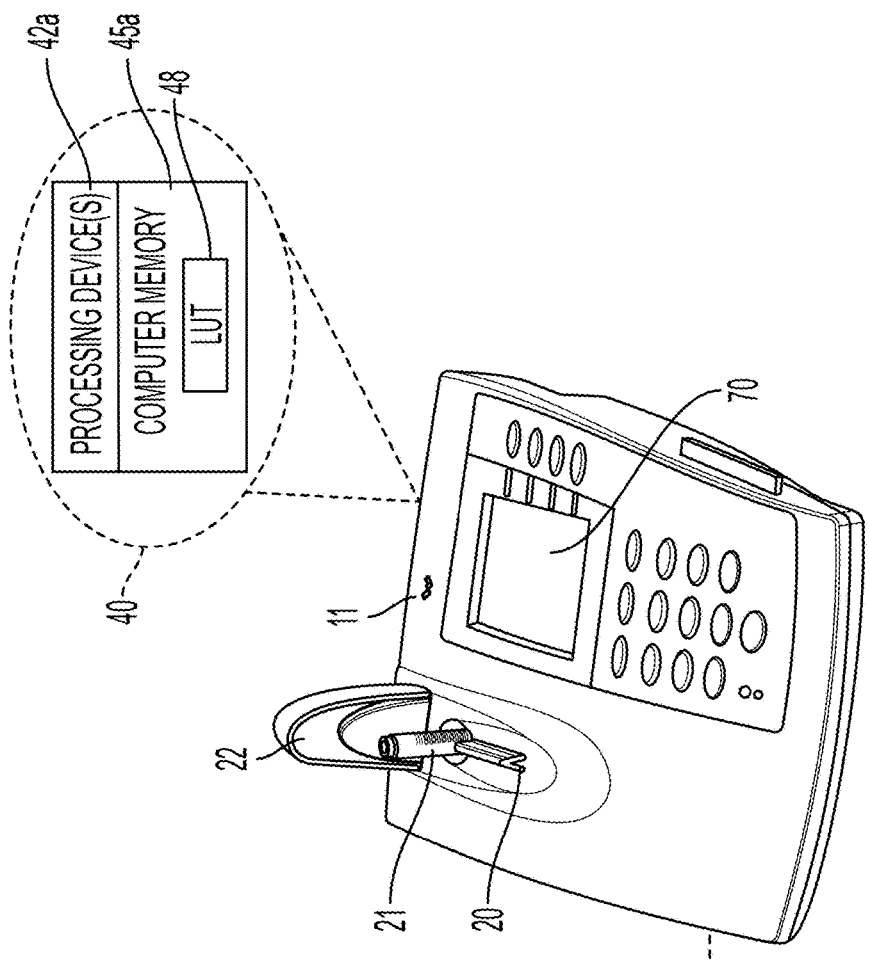
FIG. 1 is a diagram of an example test system configured to determine, for a whole blood sample, a platelet aggregation value that is substantially independent of a hematocrit of the whole blood sample.
Figure 1:
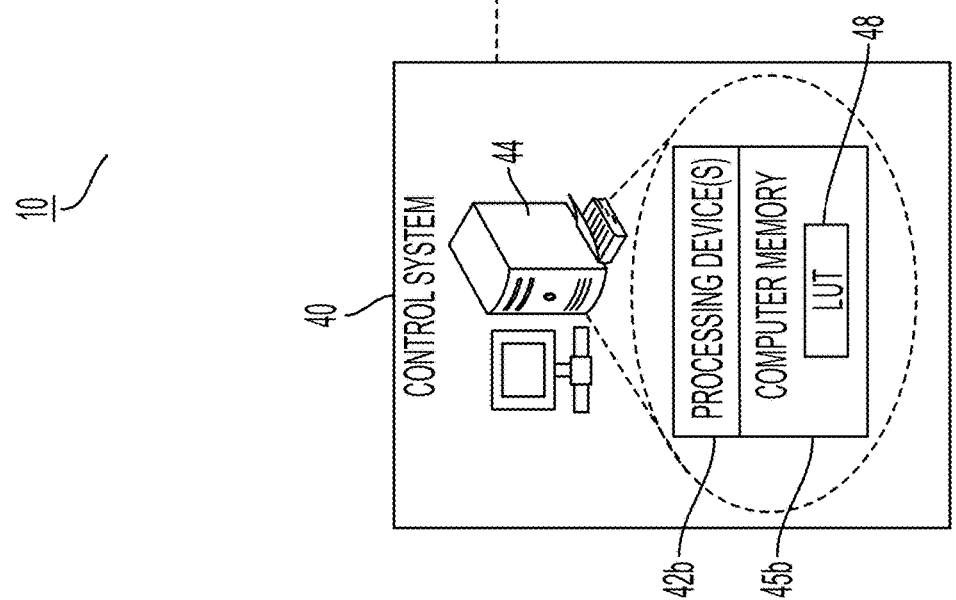

Generally, platelet function testing measures, in vitro, the activity of platelets in a whole blood sample. An example test system is configured to detect platelet activity by measuring platelet aggregation in a whole blood sample exposed to one or more agonists. A platelet agonist induces a signaling cascade that results in an activation-dependent conformational change in the major platelet membrane receptor, $\alpha IIb\beta 3$. The test system measures platelet aggregation based on a change—for example, an increase—in light transmittance through one or more chambers or wells in an assay device containing a mixture that includes the whole blood sample and the agonist. The light transmittance may be measured over time to obtain a curve reflecting a change in light transmittance. Light transmittance may be measured at a beginning of an assay and at an end of the assay and the difference between the resulting values determined.

Detection of platelet activity by the test system may be sensitive to hematocrit. Hematocrit is a measure of a volume percentage of red blood cells in a whole blood sample. In an example, as hematocrit increases, the test system reports that platelet activity has decreased even if that is not the case. That is, the perceived decrease in platelet activity is illusory in that it is not a real physical phenomenon, but rather an artifact of the test system. The perceived decrease in platelet activity may be caused by effects of large numbers of red blood cells on light transmittance through chambers of the assay device. For example, in a high hematocrit sample, the number of red blood cells is greater than that in a low hematocrit sample, and the light transmittance through the high hematocrit sample after platelet aggregation may be lower than that through the low hematocrit sample due to the differences in the numbers of red blood cells. As a result, the platelet measurement results based on the light transmittance for the two samples can be different even if the platelet functions of the two samples are the same. Accordingly, the platelet measurements results can be influenced by the hematocrit of the samples and may not be accurate.

Described herein is an example test system and variants thereof (collectively referred to as "the system") that are configured to determine platelet activity for a whole blood sample. The system is configured to determine platelet activity for the whole blood sample that is substantially independent of a hematocrit of the whole blood sample. The system is configured to perform different assays to determine platelet activity for the whole blood sample. Examples assays that may be performed include, but are not limited to, an aspirin assay that measures a patient's platelet response to aspirin and a platelet (or P2Y12) reaction unit (PRU) assay that measures the extent of platelet aggregation in the presence of P2Y12 inhibitor drugs such as clopidogrel (Plavix®), prasugrel (Effient®), ticagrelor (Brilinta®), and ticlopidine (Ticlid®). Aspirin test results are reported in aspirin resistance unit (ARU) values and PRU tests results are reported in PRU values. ARU values and PRU values are examples of platelet aggregation values reported by the VerifyNow® system. "Platelet aggregation value" as used herein, however, is not limited only to ARU values and PRU values. In some implementations, a platelet aggregation value can be any value that is obtained or derived from measurements by the VerifyNow® system and that correlates to the degree of platelet aggregation in a sample.

In an example implementation of the PRU assay, a patient citrated whole blood sample is introduced into the system. The PRU assay performed by the system includes activating fibrinogen-coated particles, such as latex beads, and the platelets by the inclusion of adenine di-phosphate (ADP). Activation of platelets via ADP in the system activates the GPIIb-IIIa (glycoprotein IIB-IIIA) receptor and this then binds to the fibrinogen-coated particles. The system also contains PGE1 (prostaglandin E1), which reduces activation of the P2Y12 receptor and therefore makes the assay specific for the P2Y12 receptor. Aggregation of the fibrinogen-coated particles occurs and this leads to a change in light transmission through the sample, which change is then measured and reported as a PRU value. Baseline platelet activity (referred to as "BASE") in the absence of platelet P2Y12 receptor inhibition is achieved by using a modified thrombin-receptor activating peptide (TRAP) in a reference channel. This description is provided for the sake if illustration and does not limit the techniques described herein to the PRU assay. The techniques are applicable to any appropriate assay.

In an example operation of the system, platelet aggregation values, such as PRU values or ARU values, and hematocrit of the same sample are determined, e.g., in a same system or device. As described below, in some examples, hematocrit-related values or analogs may be determined and used in place of the actual hematocrit. Each determination uses the same whole blood sample and is performed in a same assay device of a test instrument. In some examples, the platelet aggregation values and the hematocrit-related value can be determined using the same sample in the same detection chamber, or the same sample in different detection chambers of the same device. A relationship between platelet aggregation values and hematocrit is identified and hematocrit-based correction values are generated based on that relationship. The hematocrit-based correction values may be stored in computer memory—for example, in a look-up table (LUT) or other data structure—in association with corresponding hematocrit values. When the test instrument subsequently determines an initial, uncorrected platelet aggregation value and a hematocrit for a whole blood sample, the test system selects a hematocrit-based correction value stored in memory based on the determined hematocrit value. The test system applies the hematocrit-based correction value to the initial platelet aggregation value to produce a corrected platelet aggregation value that is independent, or substantially independent, of the hematocrit of the whole blood sample.

In another example of the system, the Beer-Lambert law is used to produce a platelet aggregation value that is independent, or substantially independent, of the hematocrit of a whole blood sample. The Beer-Lambert law relates attenuation of light to properties of a material through which that light passes. Using the Beer-Lambert law, as explained below the platelet aggregation is calculated based on an attenuation of the light transmitted through an assay device chamber containing a mixture that includes a whole blood sample to be tested. The attenuation of the light is based on a maximum amount of light that could be transmitted through the chamber, an amount of light transmitted through the mixture in the chamber at maximum platelet aggregation, and/or an amount of light transmitted through the mixture in the chamber prior to platelet aggregation. The attenuation of the light may also be based on a change in platelet aggregation, a determination of a number of platelets that have been aggregated, and/or, a time to maximum amount of platelet aggregation. Effects of hematocrit on determination of the platelet aggregation value for the whole blood sample may be substantially eliminated by the Beer-Lambert law platelet aggregation calculation.

FIG. 1 shows an example system 10 for determining platelet aggregation values for a whole blood sample that are independent, or substantially independent, of a hematocrit of the whole blood sample. System 10 includes an instrument 11. Instrument 11 is a hardware platform configured to perform automated assays such as the assays described herein. An example assay uses a mixture of whole blood and a platelet agonist incorporated in a lyophilized (freeze-dried) preparation of particles coated with human fibrinogen (referred to as "coated particles"). The coated particles may be dyed using a dye that absorbs a wavelength of light used during detection.

The example assay is based upon the ability of activated GP IIb/IIIa platelet receptors to bind to the coated particles. When activated platelets are exposed to the coated particles, aggregation occurs. Instrument 11 contains sensors to measure this aggregation as an increase in light transmittance through the resulting mixture. In this regard, in some implementations, light having a single wavelength is transmitted through a chamber in the instrument containing the mixture. The brightness of the transmitted light changes over time because activated platelets in the whole blood sample react with the coated particles and aggregate within the mixture. The resulting change in the brightness of the light corresponds to a measurement of platelet activity.

Figure 3:
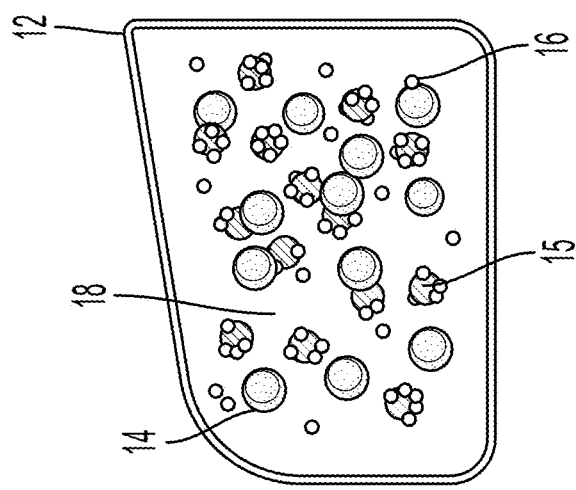
FIG. 3 is a diagram of the chamber in the example assay device used in the test system during or after platelet aggregation.
Figure 2:
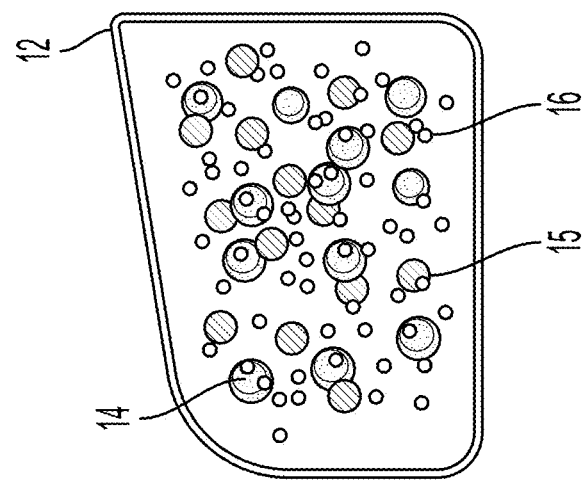
FIG. 2 is a diagram of a chamber in an example assay device used in the test system prior to platelet aggregation.

In this regard, FIGS. 2 and 3 show a chamber 12, which may be part of an assay device that is inserted into instrument 11. In this example, chamber 12 contains a mixture of whole blood including red blood cells 14, coated particles 15, and platelets 16. The platelets and coated particles are less aggregated in FIG. 2 than in FIG. 3. This reflects aggregation that has occurred from a prior state in FIG. 2 to a later state in FIG. 3 following platelet activation. As is evident from FIGS. 2 and 3, the aggregation produces more aggregate-free areas, such as area 18 in FIG. 3. The increase in aggregate-free areas from FIG. 2 to FIG. 3 allows more light to pass through chamber 12 containing the mixture. As a result, the brightness of the transmitted light changes (for example, increases), which is indicative of increased platelet aggregation.

The same light source used to determine platelet aggregation values may also be used to estimate hematocrit in a whole blood sample. As described in more detail below, transmitted light brightness may be detected, measured, or determined at the beginning of testing, before substantial chemical reactions occur. For example, the transmitted light may be measured before aggregation is detected. In an example, within the first few seconds of testing, the platelet aggregation has not progressed to the point where platelet aggregation interferes with detection of the hematocrit.

As shown in FIG. 1. Instrument 11 includes an assay device port 20. Assay device port 20 is configured to receive an assay device 21 containing one or more—for example, four—detection chambers for holding mixtures such as those described previously containing whole blood, coated particles, and platelet agonist. When assay device 21 is inserted into assay device port 20, detection chambers of the assay device are aligned with optical components included in instrument 11 to measure properties of the whole blood sample using light transmittance through a chamber. When closed, the assay device port cover 22 blocks ambient light from interfering with optical testing. In this regard, each chamber may be used for a different assay, and the light application/measurement can be asynchronous, e.g., intentionally arranged in time such that light interference between different chambers does not occur or is reduced.

Figure 4:
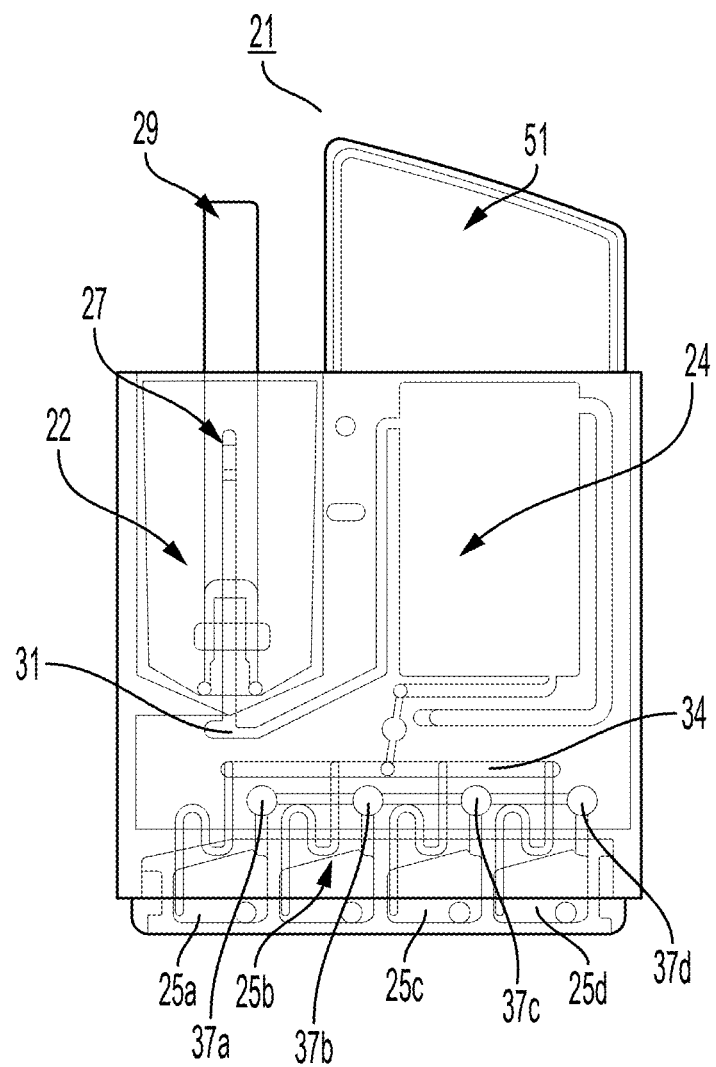
FIG. 4 is line drawing of an example assay device used in the test system.
Figure 5:
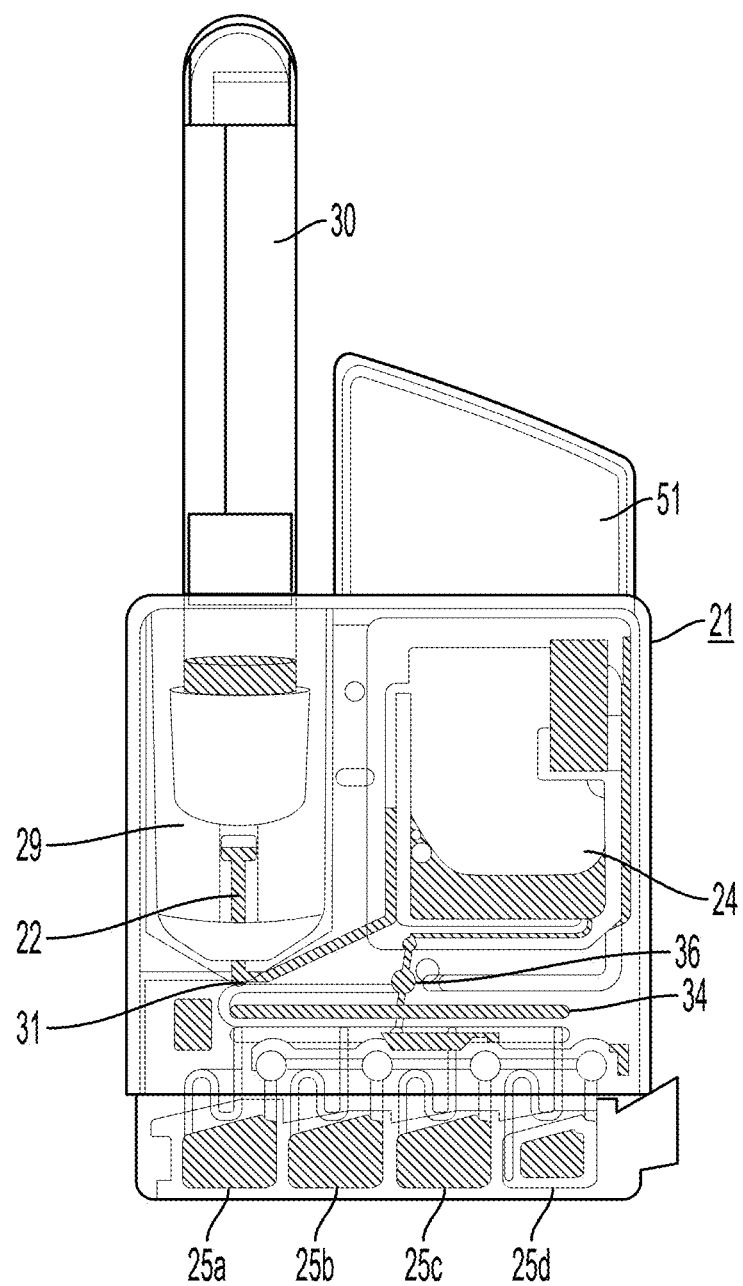
FIG. 5 is a photograph of an example assay device used in the test system.

FIGS. 4 and 5 show an example of assay device 21 that may be used inserted into assay device port 20. Assay device 21 is a plastic cartridge in this example; however, the assay device may be made of other materials, which may include one or more combinations of various plastic, glass, metal, or composite materials. Assay device 21 is disposable; however, some assay devices may be reusable. Assay device 21 includes a sample chamber (or well) 22, a staging chamber (or well) 24, and multiple detection chambers (or wells) 25a, 25b, 25c, and 25d. In the example of FIGS. 4 and 5, there are four detection chambers; however, any appropriate number of detection chambers may be included in the assay device; for example, one, two, three, four, five, six, seven, eight, or more detection chambers may be included in a single assay device. The assay device may be formed of one or more pieces of plastic. The plastic defining the detection chambers may be transparent to enable light transmission for optical testing. Plastic defining the remainder of assay device may be transparent, translucent, and/or opaque.

Figure 12:
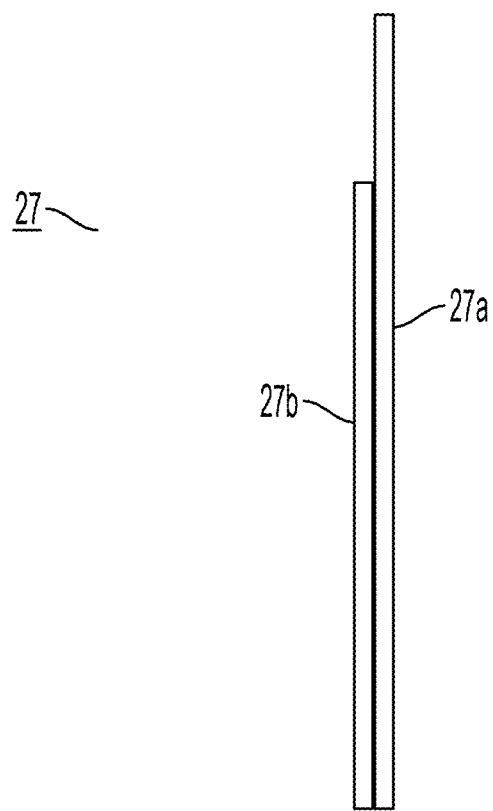
FIG. 12 shows an example needle having a dual lumen.

As shown in FIG. 4, assay device 21 includes a needle 27 and a sheath 29 associated with sample chamber 22. As shown in FIG. 5, the sheath mates to a sample tube 30 (not shown in FIG. 4). Sample tube 30 is pre-loaded with, and contains, a blood sample, such as whole blood. Needle 27 punctures sample tube 30 to draw whole blood from sample tube 30 into and through sample chamber 22. Referring to FIG. 12, in some implementations, needle 27 has a dual lumen 27a and 27b. The dual lumen allows assay device 21 to accommodate different types of sample tubes, for example, sample tubes that contain blood at different levels or heights within the tube.

In this regard, assay device 21 includes a duct 31 that creates a fluid connection between sample chamber 22 and staging chamber 24. When sample tube 30 is punctured by needle 27, suction draws whole blood from sample tube 30, through duct 31, and into staging chamber 24. The suction may be created using one or more pumps or by other appropriate mechanisms, such as a vacuum device (not shown). The one or more pumps or other mechanisms may be part of instrument 11, for example. In some implementations, staging chamber 24 may be free of air (that is, at vacuum pressure) and connected to duct 31 via a valve or other device. (not shown). When the valve is opened, vacuum in the staging chamber may suction whole blood into the staging chamber. The amount of whole blood drawn from sample chamber 22 may correspond to the number of tests to be performed. For example, if tests are to be performed in each of four detection chambers 25a to 25d, the amount of whole blood drawn into staging chamber 24 should be sufficient to perform four tests. By contrast, if a single test is to be performed—for example, testing is to be performed in detection chamber 25a only—the amount of whole blood drawn into staging chamber 24 may be sufficient to perform that single test, although excess may be drawn.

In some implementations, capillary action may draw blood from the sample tube into the staging chamber. In some implementations, the blood may be delivered directly into the staging chamber using a pipette.

While in staging chamber 24, the whole blood is heated. For example, the whole blood may be heated to 37° Celsius (C) for a period of time that is specified by the assay. Heating may be performed using one or more thermal devices (not shown) included on instrument 11 that are in thermal communication with staging chamber 24 of the assay device. Following heating, part of the whole blood is drawn from staging chamber 24 into one or more of detection chambers 25a to 25d. In this regard, assay device 21 includes ducts 34 that create fluid connections between sample chamber 24 and each of detection chambers 25a to 25d. Ducts 34 enable heated whole blood to flow from staging chamber 24 into each of detection chambers 25a to 25d. The flow of whole blood from staging chamber 24 to detection chambers 25a to 25d may be selective and controllable. For example, whole blood may be moved from staging chamber 24 into detection chambers 25a and 25b, but not into detection chambers 25c and 25d. To this end, controllable mechanical stops may be arranged along ducts 34 and/or within the detection chambers to enable control of blood flow.

In the example of FIG. 5, a mechanical stop 36 may be located at the exit of staging chamber 24 to prevent flow of whole blood into detection chambers 25a and 25b during filling of and/or heating in staging chamber 24.

Referring to FIG. 4, mechanical stops 37a, 37b, 37c, and 37d may be associated with, or included in, respective detection chambers 25a, 25b, 25c, and 25d. For example, mechanical stops 37a, 37b, 37c, and 37d may each be connected to a vent output of a respective detection chamber. Pressure maintained in each detection chamber by a mechanical stop prevents flow of fluid into a respective detection chamber. To allow fluid to flow into a detection chamber, a mechanical stop is opened to the vent, thereby releasing the pressure in the detection chamber and allowing the detection chamber to fill. In some implementations, the mechanical stops may include valves or other mechanical or electromechanical controllable devices.

Each detection chamber 25a to 25d is configured for use in performing a test on a whole blood sample using a mixture contained therein. One or more (for example, all) of detection chambers 25a to 25d contain a mixture of coated particles or pellets containing coated particles and one or more platelet agonists.

Examples of agonists that may be used in a detection chamber include, but are not limited to, one or more of the following: adenine di-phosphate (ADP), arachidonic acid (AA), thrombin receptor activator peptide (TRAP), collagen, thrombin, thromboxane $A_2$, epinephrine, ellagic acid, and ristocetin, Within each detection chamber, agonists may be used individually or in combination. For example, a single detection chamber may contain coated particles including a single one of the foregoing agonists or a single detection chamber may contain coated particles including two or more of the foregoing agonists. Furthermore, one or more of detection chambers 25a to 25d may contain other substances in addition to those listed, which may be based on the assay to be performed using the mixture in the detection chamber. Still further, one or more of the detection chambers may contain fewer substances than those listed. For example, a detection chamber may be configured to contain whole blood only.

Different detection chambers 25a to 25d may be used to perform different tests including, but not limited to, different platelet aggregation assays such as those described previously. To this end, different ones of the detection chambers may contain different agonists, different combinations of agonists, or the same combinations of agonists but with different amounts of each. For example, detection chamber 25a may contain ADP, detection chamber 25b may contain AA, detection chamber 25c may contain TRAP, and detection chamber 25d may contain ristocetin.

The testing performed in each detection chamber 25a to 25d may be independent of testing performed in one or more, or all, others of the detection chambers. For example, detection performed in detection chamber 25a may be unrelated to detection performed in detection chamber 25b; detection performed in detection chamber 25b may be unrelated to detection performed in detection chamber 25c; and so forth. In this context, independent testing includes, but is not limited to, platelet aggregation testing using different agonists, hematocrit testing, and/or other types of blood testing. The different types of testing, however, are on the same whole blood sample delivered into the staging chamber. That is, as described herein, portions of that whole blood sample are delivered into various detection chambers 25a to 25d where the different tests may be performed.

In this regard, heated whole blood is moved from staging chamber 24 into target one or ones of detection chambers 25a to 25d. That is, part of the whole blood sample is moved into each detection chamber where a test is to be performed. Appropriate mechanical stops may be controlled to open or to close—for example, by a control system as described below—to enable flow of the whole blood sample into detection chambers 25a to 25d. In some implementations, the flow may be implemented through positive pressure, negative pressure, or a combination of positive and negative pressure implemented using one or more pumps or other appropriate mechanisms included on instrument 11.

For the sake of illustration, the examples presented with respect to FIG. 6 below assume that platelet aggregation testing is to be performed in multiple detection chambers. Furthermore, although testing is performed on only part of the whole blood sample, each test performed is considered to determine a characteristic—for example, a platelet aggregation value—of the whole blood sample.

Referring back to FIG. 1, control over testing may be implemented by a control system 40 embedded in, and/or associated with, instrument 11. In some implementations, components of the control system may be distributed across instrument 11 and one or more computing devices in communication with instrument 12.

The control system may include one or more processing devices, examples of which are described herein. One or more processing devices 42a may be reside within instrument 11, as shown in FIG. 1. In some implementations, control system 40 may be or include a computing system 44 having one or more processing devices 42b. Computing system 44 may be separate from instrument 11, but may be connected to instrument 11 directly or via a wired or wireless computer network to enable communication between the instrument and the computing system.

Computer memory 45a, 45b may be located in instrument 11 and/or in computing system 44. The computer memory may store hematocrit-based correction values, as described herein. In an example, the hematocrit-based correction values may be stored in a LUT 48; however, other data structures may be used. Controls implemented by the control system may include, but are not limited to, controlling correction of platelet aggregation values based on hematocrit or hematocrit-related values or analogs, controlling mechanical stops to control flow of liquid in the assay device, controlling pressure within the assay device, controlling illumination of the detection chambers, and controlling operation of the optical sensors.

Upon insertion of assay device 21 into assay device port of instrument 11, the instrument automatically scans a barcode contained on the assay device. The control system determines which assay is to be performed using the assay device based on the content of the barcode. The control system then takes appropriate action to implement that assay. Assay device 21 also includes a gripper 51 to enable movement into or out of the assay device slot of instrument 11.

One or more of detection chambers 25a to 25d may contain coated particles or pellets including platelet agonist. As also explained previously, human fibrinogen-coated particles bind to available platelet receptors in the whole blood sample containing platelets activated by the agonist. That is, mixing of the agonist with the whole blood starts a platelet reaction leading to platelet aggregation.

Figure 6:
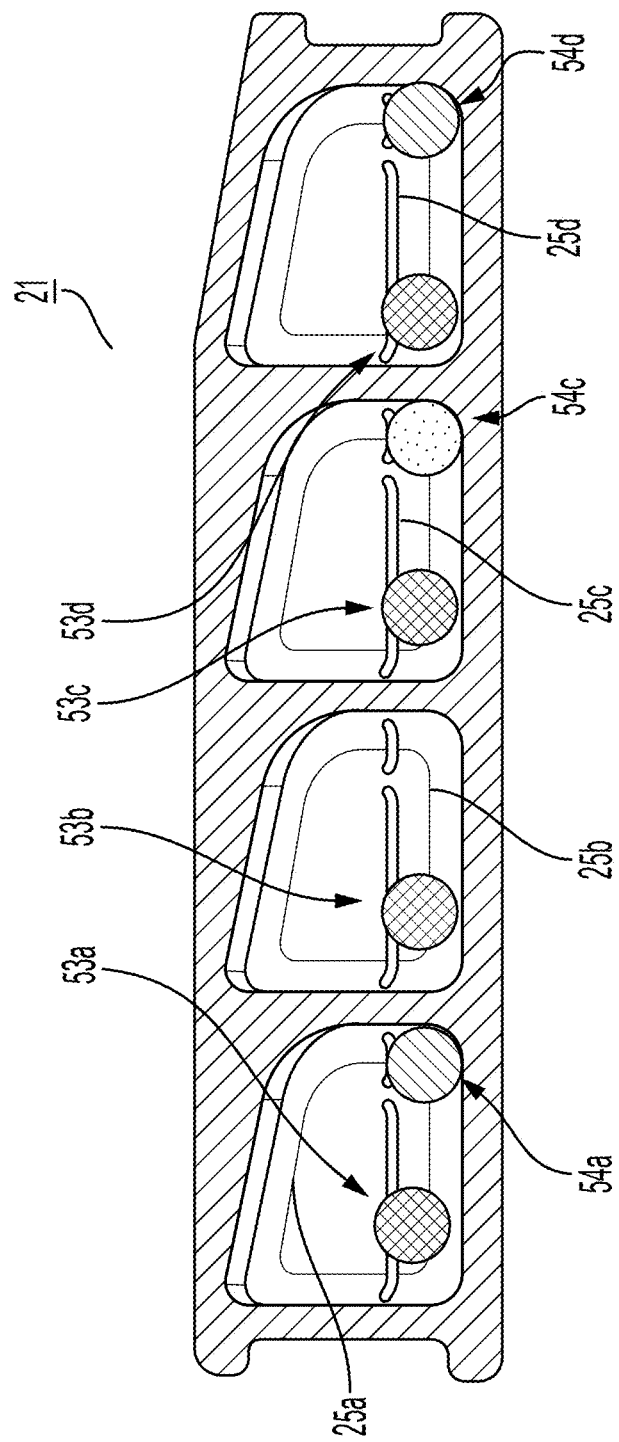
FIG. 6 is a close-up diagram of detection chambers included in the example assay device of FIGS. 4 and 5.

In the example of FIG. 6, each assay device detection chamber 25a to 25d also contains a mixing ball 53a to 53d to mix its contents with received whole blood. Other methods of mixing, such as changes in pressure within the chambers and changes in fluid velocity, may be used to implement mixing of chamber contents with received whole blood. In the example of FIG. 6, detection chambers 25a and 25d contain P2Y12 agonist particles 54a and 54d respectively, detection chamber 25b contains no coated particles or platelet agonist, and detection chamber 25c contains a no-agonist, or neutral, particle 54c that does not act upon whole blood drawn into that detection chamber. Different tests may be performed in different detection chambers.

Figure 7:
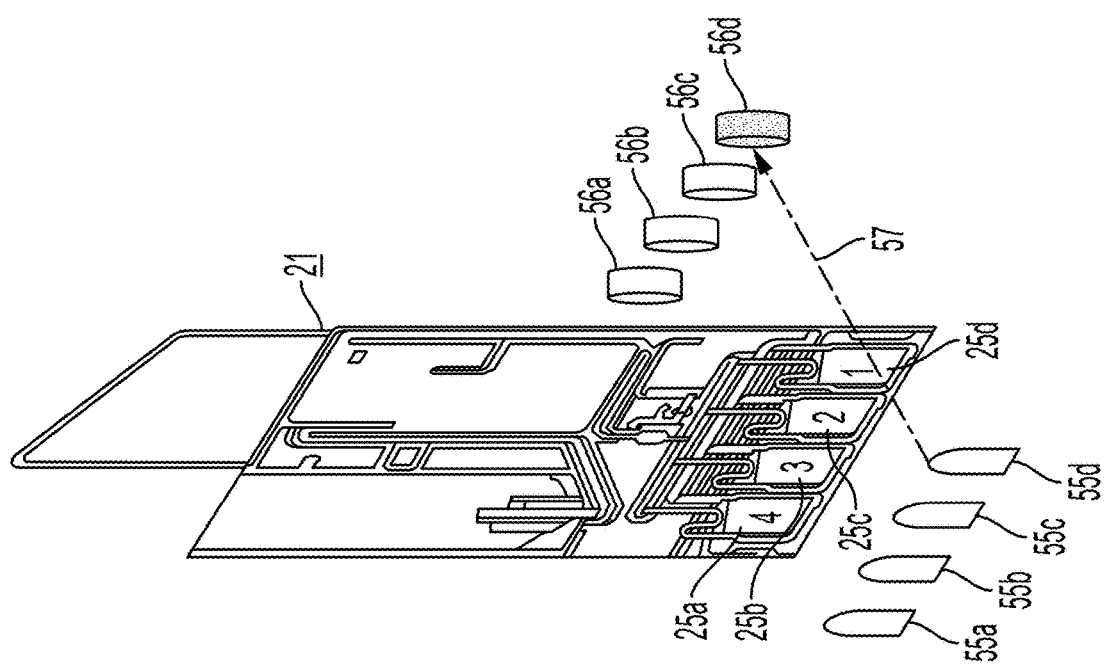
FIG. 7 is a perspective view of the example assay device of FIGS. 4 and 5 showing a relationship of the detection chambers to optical emitter/receiver pairs.

As explained previously, instrument 11 measures platelet aggregation based on a change in light transmittance through a detection chamber. For example, as previously explained, as platelet activity in a detection chamber increases, aggregates form in the whole blood contained in the detection chamber, allowing more light to be transmitted through the detection chamber. FIG. 7 shows optical emitters 55a, 55b, 55c, and 55d and corresponding optical receivers 56a, 56b, 56c, and 56d arranged relative to each respective detection chamber 25a, 25b, 25c, and 25d of example assay device 21. Each optical emitter may be or include a light source, such as a light-emitting diode (LED) or a laser diode (LD). Each optical receiver may be an optical sensor, such as a photodetector. As shown each optical emitter/optical receiver pair is configured—for example, sized, shaped, and/or arranged—so that light 57 from an optical emitter (e.g., 55d) passes through a respective detection chamber (e.g., 25d) and onto a respective optical receiver (e.g., 56d).

Figure 8:
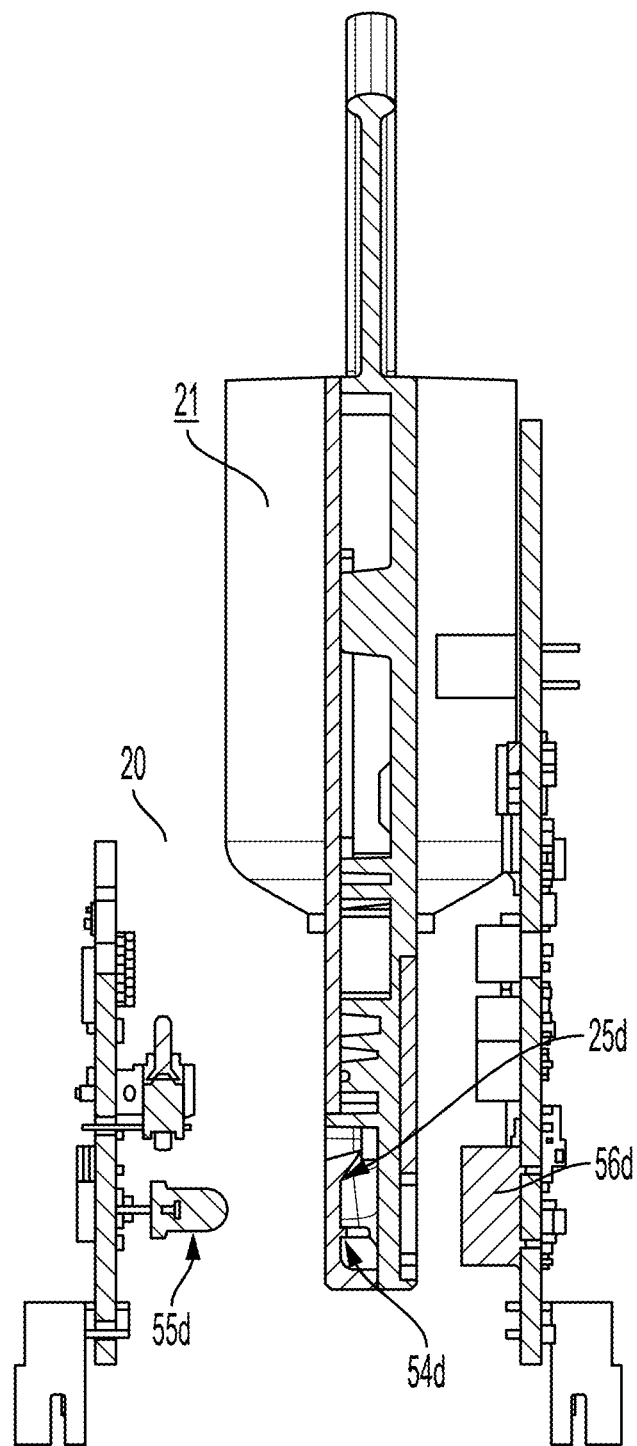
FIG. 8 is a side view of the example assay device of FIGS. 4 and 5 showing a relationship of a detection chamber to an optical emitter/receiver pair.

FIG. 8 is a side view of an example assay device 21 showing the positional relationship between an optical emitter 55d, a detection chamber 25d, and an optical receiver (detector) 56d. In the example of FIG. 6, assay device 21 (a cartridge in this example) is inserted within the assay device slot 20 of an instrument such as instrument 11 of FIG. 1. As shown in the figure, when assay device 21 is inserted into the assay device slot, detection chamber 25d aligns optically (and physically in this example) to both optical emitter 55d and optical receiver 56d so that light from optical emitter 55d passes through detection chamber 25d and is received by optical receiver 56d.

The optical emitter/optical receiver pairs are controllable to perform detection in different detection chambers independently and separately. For example, optical emitter 55a may be activated (turned-on) to illuminate detection chamber 25a while optical emitters 55b to 55d are deactivated (turned-off) and, therefore, are dark. Optical receiver 56a thus detects light from optical emitter 55a without interference from light from the other optical emitters. Control system 30 receives or reads data from the optical receiver, which data represents light transmitted through the mixture in the detection chamber. Thereafter, optical emitter 55b may be activated to illuminate detection chamber 25b while optical emitters 55a, 55c, and 55d are deactivated and, therefore, are dark. Optical receiver 55b detects light from optical emitter 55a without interference from light from the other optical emitters. Control system 30 receives or reads data from the optical receiver, which data represents light transmitted through the mixture in the detection chamber. Thereafter, optical emitter 56c may be activated to illuminate detection chamber 25c while optical emitters 55a, 55b, and 55d are deactivated and, therefore, are dark. Optical receiver 56c detects light from optical emitter 55a without interference from light from the other optical emitters. Control system 30 receives or reads data from the optical receiver, which data represents light transmitted through the mixture in the detection chamber. Thereafter, optical emitter 55d may be activated to illuminate detection chamber 25d while optical emitters 55a to 55c are deactivated and, therefore, are dark. Optical receiver 56d detects light from optical emitter 55d without interference from light from the other optical emitters. Control system 30 receives or reads data from the optical receiver, which data represents light transmitted through the mixture in the detection chamber.

In some implementations, two or more of the optical emitters may remain illuminated at the same time during testing. For example, optical emitters 55a and 55d may be controlled to be fully illuminated to perform testing in detection chambers 25a and 25d. At the same time, optical emitters 55b to 55c may be turned off.

In some implementations, light may be pulsed through each chamber at a different frequency. Each detector may include a filter that enables the detector to detect the light pulsed at a particular frequency. This may reduce interference caused by light from one chamber impacting an adjacent chamber.

In some implementations, all four detection chambers 25a to 25d may be used for testing in parallel—for example, testing in all four chambers 25a to 25d may be performed at the same time. In some examples, all four optical emitters 55a to 55d are fully illuminated at the same time and for the same or different durations. In some implementations, testing in parallel may be performed using a subset of the detection chambers. For example, optical emitters 55a and 55c may be fully illuminated to perform testing in respective detection chambers 25a and 25c. However, adjacent optical emitters 55b and 55d may be dimmed or deactivated so as to limit optical interference with the testing performed in detection chambers 25a and 25c. Thereafter, optical emitters 55a and 55c may be dimmed or deactivated and adjacent optical emitters 55b and 55d may be fully illuminated to enable testing in detection chambers 25b and 25d. The two sets of optical emitters may by cycled on and off in this manner to perform multiple rounds of testing with limited optical interference.

The optical emitter/receiver pairs may be activated in sequence, for example, in the same order that the detection chambers are arranged. Generally, however, the optical emitter/receiver pairs may be activated in any appropriate order and are not limited to activation in the same order that the detection chambers are arranged. In some implementations, the optical emitters are each controllable to illuminate a respective detection chamber for one millisecond (ms), however, the system is not limited to this time period and the optical emitters may be controllable to illuminate a respective detection chamber for any appropriate period of time. For example, the system may be configured to allow optical emitters to illuminate a detection chamber for 2 ms, 3 ms, 4 ms, 5 ms, 6 ms, and so forth. In some implementations the wavelength of the light emitted by one or more, for example all, of the optical emitters may be near infrared for example at or about 800 nanometers (nm). This wavelength corresponds to the isosbestic point for a blood sample. The isosbestic point is a wavelength at which the total absorbance of the blood sample does not change during a chemical reaction or a physical change of the blood sample. In some implementations the wavelength of the light emitted by one or more of the optical emitters may exceed 600 nm, may exceed 700 nm, may exceed 800 nm, may exceed 900 nm, may exceed 1000 nm, and so forth.

As explained previously, platelet aggregation testing of a whole blood sample performed by test system 10 may be sensitive to hematocrit in that the platelet aggregation value may be affected by the hematocrit of the blood sample. The hematocrit effects on platelet aggregation may result from red blood cells blocking light transmission through the detection chambers and are not reflective of an actual physical dependence of platelet activity on hematocrit. In an example, a hematocrit of 18% (6 g/dL—grams-per-deciliter—hemoglobin) is at a low range of hematocrit values that may adversely affect platelet aggregation values for a whole blood sample. The changes in platelet aggregation values as a function of hematocrit of the sample can be viewed as an artifact of the system used for platelet aggregation measurement. More specifically, platelet aggregation measurement results demonstrate a negative correlation with hematocrit. However, the correlation of platelet aggregation and hematocrit is an in vitro artifact rather than a biological phenomenon. The system described herein is configured to correct this artifact. For example, platelet aggregation values may be corrected so that the platelet aggregation values are effectively independent of hematocrit in a whole blood sample. This dependence of platelet aggregation values (in this example, PRU values) on hematocrit is shown, for example, in plot 59 of FIG. 9. If there were no dependence as should be the case, that plot would look similar to plot 60 of FIG. 10. In this regard, each of plots 59 and 60 show PRU values on the Y-axis and hematocrit values (HCT) on the X-axis. Individual measurements of different human subjects are plotted, and linear regressions are performed to obtain lines 59a and 60a based on the plotted points.

In an example implementation, the system is configured to test platelet aggregation and obtain hematocrit (or a hematocrit-related value) using the same whole blood sample in the same single detection chamber of an assay device, and to correct the resulting platelet aggregation values by removing the hematocrit dependence. Accordingly, hematocrit or the hematocrit-related value is determined using the same sensors and chambers as used for platelet aggregation measurement. The resulting data is used to correct for platelet aggregation value hematocrit dependence, as described below. Different processes may be used to correct for platelet aggregation value hematocrit dependence.

Figure 11:
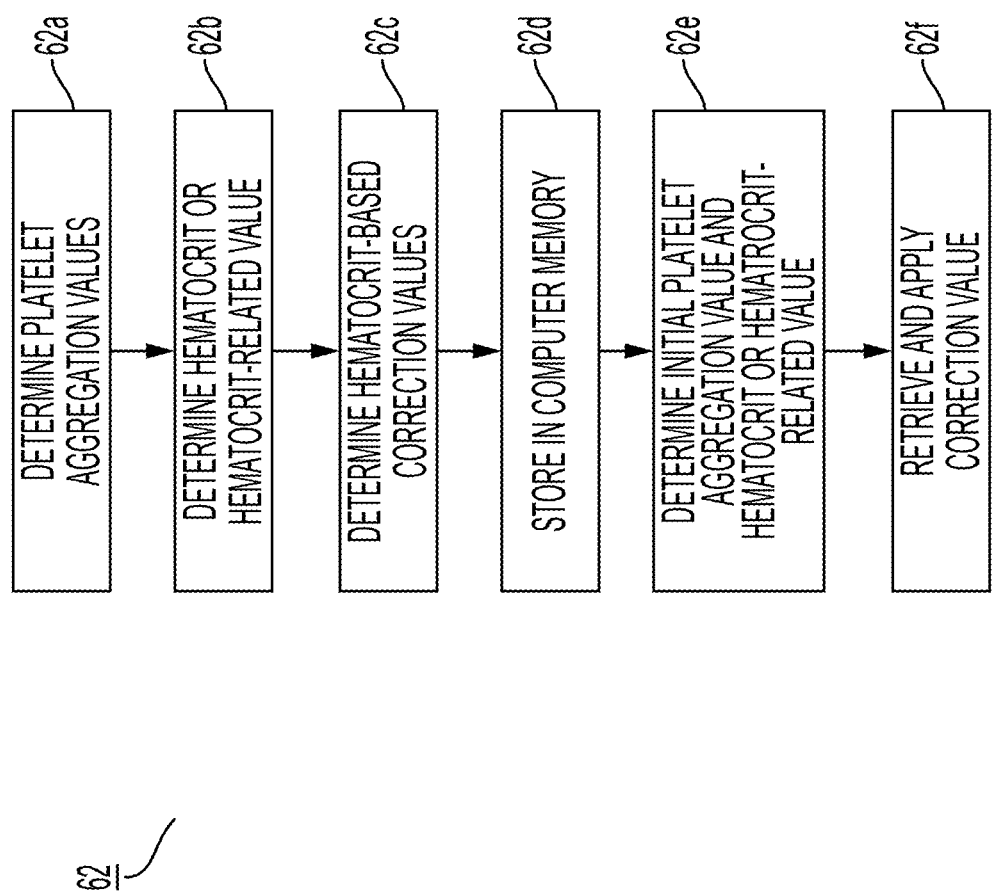
FIG. 11 is a flowchart showing an example process for applying a correction value to a platelet aggregation value of a whole blood sample to reduce the illusory dependence of the platelet aggregation value on a hematocrit of the whole blood sample.

Referring to FIG. 11, in a first example process 62, hematocrit-based correction values are determined for instrument 11. Note that the operations of process 62 need not be real-time operations. In some implementations, operations 62e and 62f do not occur in real-time (for example, immediately time after operation 62d). Hematocrit-based correction values may be applicable across instruments of a same type or model.

According to process 62, platelet aggregation values, such as PRU or ARU values, are determined (62a) using an instrument such as instrument 11 for a statistically significant number of whole blood samples. For example, platelet aggregation values for hundreds or thousands of whole blood samples from various human subjects may be determined. A hematocrit or hematocrit-related value for each of those same whole blood samples is also determined (62b). In this regard, a hematocrit-related value need not be the actual hematocrit of a whole blood sample, but rather may be a measurement that is correlated with a hematocrit of the whole blood sample. An example of a measurement that is based on hematocrit is the brightness of light shone through a detection chamber such as 25d (FIG. 7) containing a mixture.

The same whole blood sample for each subject is used to determine a platelet aggregation value and a hematocrit or hematocrit-related value. In this regard, in some implementations, for each subject, a whole blood sample may be loaded into assay device 21 and that whole blood sample may be tested to determine both its platelet aggregation value and its hematocrit or hematocrit-related value. The platelet aggregation value may be measured optically in a detection chamber such as 25d containing coated particles by measuring an increase in light transmittance through the detection chamber. In some implementations, each platelet aggregation value and hematocrit value or hematocrit-related value may be determined optically using a same portion of the blood sample in the same detection chamber such as chamber 25d. That is, for each subject, the hematocrit or hematocrit-related value may be detected optically in the same detection chamber used to determine the platelet aggregation value. In some examples, the same light source can be used to estimate the hematocrit based on the brightness of light transmitted through the detection chamber at the beginning of platelet aggregation before substantial chemical reactions take place, as described above. As explained previously, in optical measurement of hematocrit levels, the whole blood in a detection chamber is illuminated using light at near infrared wavelengths such as 800 nm, and a concentration of red blood cells in the whole blood sample (the hematocrit) is estimated based on intensity of the transmitted light.

In some implementations, a portion of the whole blood sample may be loaded into detection chamber 25c that contains a no-agonist, or neutral, particle (FIG. 6) that does not act upon whole blood drawn into detection chamber 25c. The hematocrit or hematocrit-related value of the whole blood sample may then be determined optically in that detection chamber 25c. In some implementations, a portion of the whole blood sample may be loaded into detection chamber 25b that contains no coated particles. The hematocrit or hematocrit-related value of the whole blood sample may then be determined optically in that detection chamber 25b.

Figure 9:
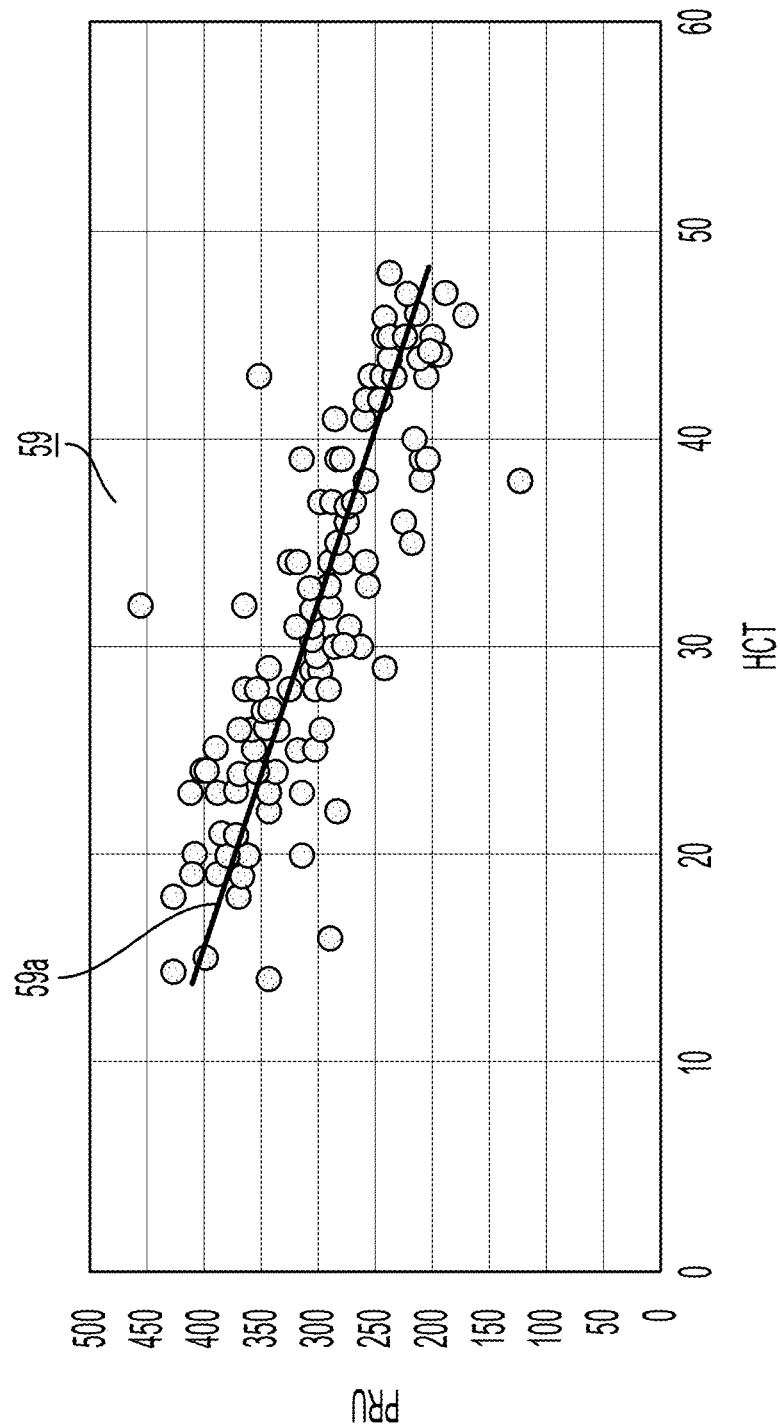
FIG. 9 is a plot showing an illusory dependence of platelet aggregation values of whole blood samples on hematocrit of the whole blood samples.

The resulting data from example testing performed on whole blood of various subjects shows a correlation between platelet aggregation and hematocrit (or hematocrit-related value), as represented by the plot 59 in FIG. 9. For example, the platelet aggregation results for the test system demonstrate a negative correlation with hematocrit. Accordingly, process 62 includes determining (62c) hematocrit-based correction values to correct for the negative correlation of the platelet aggregation values with hematocrit. The hematocrit-based correction values may be calculated based on the slope of line 59a of plot 59. For example, correction values may be determined so that initially-determined platelet aggregation values in the distribution shown in FIG. 9 approximate the hematocrit-corrected platelet aggregation values in the distribution shown in FIG. 10. That is, the hematocrit-based correction values may be calculated to adjust initially-determined platelet aggregation values so that there is no, or substantially no, correlation with hematocrit and so that plot 59 for initially-determined platelet aggregation values changes from line 59a having a negative slope to a line 60a having a near-zero slope (or at least a lesser slope) as shown in FIG. 10.

Figure 10:
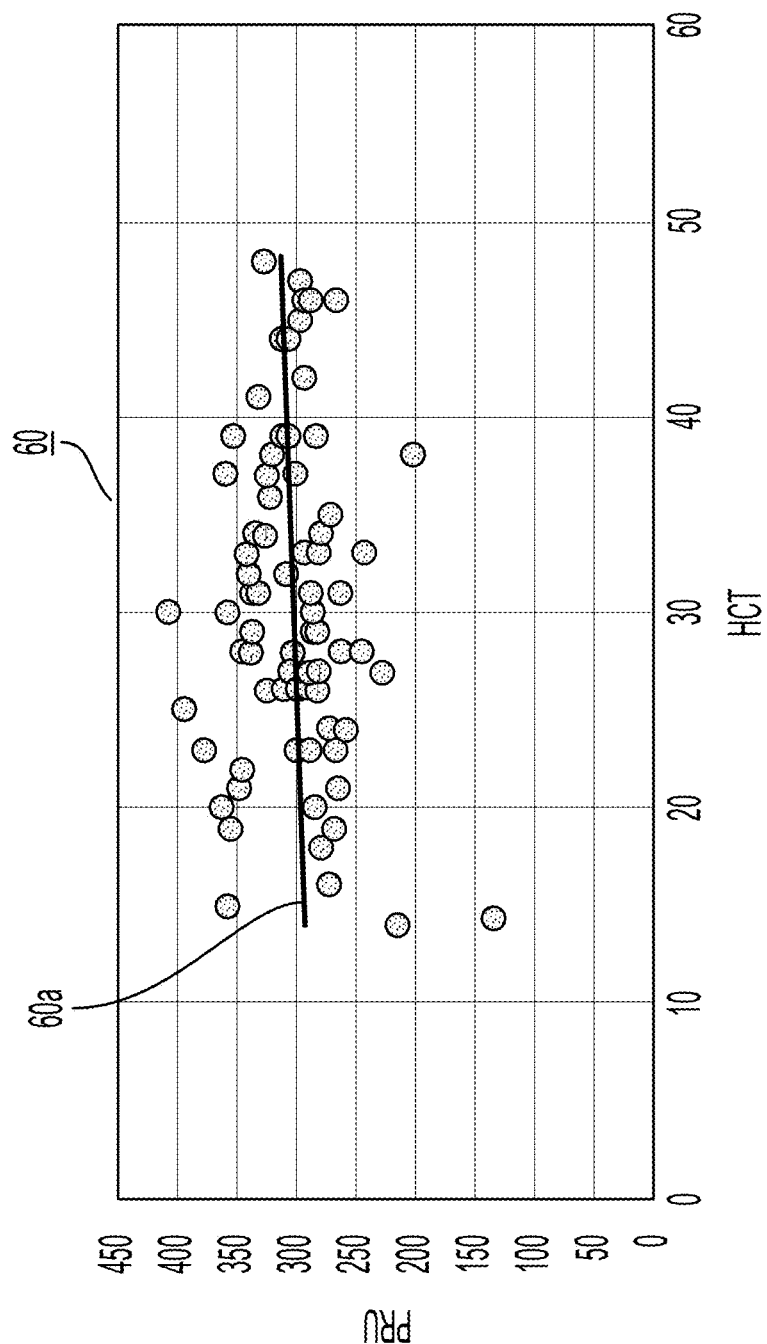
FIG. 10 is a plot showing the platelet aggregation values of whole blood samples that have been adjusted to reduce the illusory dependence of the platelet aggregation values on hematocrit of the whole blood samples.

In this regard, the example of FIGS. 9 and 10 describe generating the hematocrit-based correction values based on actual hematocrit values. In some implementations, the hematocrit-based correction values may be generated based on information, such as light brightness through a detection chamber, that is related to hematocrit. In such cases, a plot like that of FIG. 9 may be generated, with brightness on the Y-axis. The hematocrit-based correction values may then be determined as described above.

The determined hematocrit-based correction values may be associated with corresponding hematocrit or hematocrit-related values and stored (62d) in a look-up table (LUT) or other type of data structure in computer memory 45a, 45b (FIG. 1) that is accessible to the control system. The hematocrit-based correction values may be used to determine a corrected platelet aggregation value of a whole blood sample that is independent of, or substantially independent of, the hematocrit of the whole blood sample. In some implementations, lines 59a and 60a may be stored as graphs in memory and hematocrit-based correction values may be calculated as described herein by referencing those lines, rather than using a LUT to store the correction values.

During testing, a platelet aggregation value correction process includes delivering a whole blood sample into a detection chamber such as detection chamber 25d (FIG. 7). Referring also to FIG. 11, an initial platelet aggregation value and the hematocrit (or hematocrit-related value) of the whole blood sample are determined (62e) by the control system based on light transmitted through the detection chamber by an optical emitter and detected by the optical receiver. The initial platelet aggregation value, however, is dependent on the hematocrit of the whole blood sample, as described previously. Accordingly, the control system uses the determined hematocrit or hematocrit-related value to obtain a hematocrit-based correction value from computer memory.

In some implementations, a LUT or other data structure associates hematocrit-based correction values with corresponding hematocrit values or hematocrit-related values. For example, during testing, the correction process includes loading a whole blood sample into a detection chamber such as detection chamber 25d. In an example, both the hematocrit and an initial platelet aggregation value of the whole blood sample may be determined from the same portion of the whole blood sample in the same detection chamber or from the same whole blood sample in two different detection chambers. The control system determines the hematocrit (or hematocrit-related value) based on light transmission through the detection chamber at a point prior to, or at the beginning of, chemical reactions occurring in the detection chamber. The control system determines the platelet aggregation value following or during those chemical reactions—for example, those chemical reactions that result in aggregation or agglutination—based on light transmission through the detection chamber.

The control system may use the resulting hematocrit (or hematocrit-related value) for the sample to obtain a hematocrit-based correction value from the LUT that corresponds to the hematocrit. That is, the hematocrit-based correction values in the LUT may be indexed by hematocrit (or hematocrit-related value). The hematocrit-based correction value in the LUT that matches, or that most closely matches, the determined hematocrit value (or hematocrit-related value) may be selected and applied to the platelet aggregation value to perform the correction, as described above. The correction value may be a factor or an absolute value in the same unit as the platelet aggregation value. For example, the initial platelet aggregation value may be multiplied or divided by the hematocrit correction value and/or added to or subtracted by the hematocrit-based correction value, or otherwise mathematically processed with the hematocrit-based correction value to adjust the initial platelet aggregation value. The adjusted value is a platelet aggregation value that is independent of, or substantially independent of, the hematocrit of the whole blood sample. As noted, the foregoing may be performed using a hematocrit-based value, such as brightness, instead of the actual hematocrit.

In some cases, there may not be a hematocrit-based correction value stored in memory that directly corresponds to a detected hematocrit or hematocrit-related value. In cases such as this, the control system may select the hematocrit-based correction value that is closest to the detected value. In some implementations, the control system may, e.g., average two hematocrit-based correction values that are for the detected values in that are adjacent to the detected hematocrit or hematocrit-related value and above and below the detected hematocrit or hematocrit-related value. In some implementations, the control system may, e.g., interpolate between two hematocrit-based correction values. In some implementations, the control system may, e.g., determine a hematocrit-based correction value by extrapolation based on a detected value and a stored hematocrit-based correction value.

In some implementations, a hematocrit-based correction value may be obtained for a single detection chamber in assay device 21 and used to correct platelet aggregation values exhibiting hematocrit dependence in one or more—for example, all—of the remaining chambers. For example, a hematocrit-based correction value may be obtained for detection chamber 25a (FIG. 7) and that hematocrit-based correction value may be used to correct platelet aggregation values measured using detection chambers 25b to 25d. In some implementations, hematocrit-based correction values may be obtained to correct platelet aggregation values measured in each of detection chambers 25a to 25d. Those hematocrit-based correction values may be combined or processed to produce a hematocrit-based correction value that may be used to correct platelet aggregation values measured in each of detection chambers 25a to 25d. For example, a hematocrit-based correction value may be obtained for each of detection chambers 25a to 25d and those hematocrit-based correction values may be averaged.

The resulting average hematocrit-based correction value—that is, the same hematocrit-based correction value—may be used to correct platelet aggregation values measured in detection chambers 25a to 25d. In another example, a weighted average of the hematocrit-based correction values may be used. For example, one of the hematocrit-based correction values may be selected and weighted more heavily than the other hematocrit-based correction values during averaging or other types of processing.

In a second example process, a platelet aggregation value for a whole blood sample is corrected based on the Beer-Lambert law to remove or to reduce platelet aggregation dependence on hematocrit. Using this type of correction process, the hematocrit need not be determined separately. Rather, determination of the corrected platelet aggregation value inherently includes a correction based on the hematocrit. As described in more detail below, the platelet aggregation value is determined based on a non-linear (e.g., logarithmic) mathematical relationship between the hematocrit of a whole blood sample and platelet aggregation occurring in the whole blood sample.

In the context of the Beer-Lambert law, the following definitions apply for a system having a detection chamber containing a mixture of whole blood, a platelet agonist, and coated particles.

$I_0$: a maximum brightness of light that can pass through the detection chamber $I_1$: a brightness of light that passes through the mixture in the detection chamber before platelet aggregation begins (for example, at a beginning of a test)

$I_2$: a brightness of light that passes through the mixture in the detection chamber at a point of maximum aggregation (for example, at or near the end of a test)

E: molar absorptivity, which is a measurement of how strongly the mixture attenuates the light at a transmitted wavelength (e.g., 800 nm)

b: a distance that the light travels through the detection chamber

C: a concentration of particles in the mixture in the detection chamber

Of these, values for E and b are constant for a given platelet aggregation test and are combined in equation (1) below into the constant value "k".

In some implementations, the values for $I_1$, and $I_2$ may be determined from a same portion of a whole blood sample in a same detection chamber. For example, $I_1$ can be measured based on the brightness of light transmitted through the detection chamber at the beginning of platelet aggregation testing just prior to or when chemical reactions are initiated. For example, $I_2$ can be measured based on the brightness of light transmitted through the detection chamber at or near completion of platelet aggregation testing when all clotting that can occur has occurred. The precise timings at which $I_1$ and $I_2$ are measured may be dictated by the assay being performed.

In some implementations, the value for $I_0$ may be determined in a calibration operation that may be performed separate from, and in some cases before, platelet aggregation testing. For example, $I_0$ can be measured based on the brightness of light transmitted through a detection chamber having no content in the detection chamber. For example, $I_0$ can be measured based on the brightness of light transmitted through the detection chamber before a mixture with or without whole blood enters the detection chamber. For example, referring to FIG. 6 platelet aggregation testing may be performed in detection chamber 25d. The separate calibration operation to determine $I_0$ may be performed in detection chamber 25b.

There are three substances (or species) containing particles considered in this example process based on the Beer-Lambert law. These include:

base_blood: whole blood particles including red blood cells $C_{base\_blood}$: concentration of the blood particles in the whole blood cp: coated particles, such as fibrinogen-coated beads described above platelets: platelets included in the whole blood $C_{particles\ \&\ platelets}$: concentration of the coated particles and the platelets in the mixture The platelet aggregation value corresponds to changes in concentrations of particles and platelets. For example, aggregation of the platelets causes concentrations of the combined coated particles and platelets to decrease. That is, since the coated particles and platelets are no longer separated in the mixture, their concentrations lessen. Prior to platelet aggregation, the following non-linear relationship among the variables holds true:

$$\text{Log}(I_0/I_1) = kC_{base\_blood} + kC_{particles\ \&\ platelets}$$

At a time of maximum platelet aggregation, the following non-linear relationship among the variables holds true:

$$\text{Log}(I_0/I_1) = kC_{base\_blood} + \Delta kC_{particles\ \&\ platelets},$$

where $\Delta kC_{particles\ \&\ platelets}$ corresponds to the change in concentration of the combined coated particles and platelets.

The platelet activity due to aggregation can be determined using equation (1) below. This example shows determination of a PRU platelet aggregation value; however, Beer-Lambert law calculations may be used to determine platelet aggregation values other than PRU values.

$$\begin{aligned} PRU &= (\Delta C_{particles\ \&\ platelets})/(C_{particles\ \&\ platelets}) \\ &= (\text{Log}(I_0/I_2) - C_{base\_blood})/(\text{Log}(I_0/I_1) - C_{base\_blood}) \end{aligned} \quad (1)$$

According to equation (1), the platelet aggregation value is determined based on an attenuations of light transmitted through the mixture in the detection chamber and a concentration of blood particles in the whole blood sample ($C_{base\_blood}$), which is known or determined prior to platelet aggregation testing. The attenuations of the light ($I_0/I_2$) and ($I_0/I_1$) are determined during testing and are based on a maximum amount of light that could be transmitted through the chamber ($I_0$), an amount of light transmitted through the mixture in the chamber at predefined (e.g., maximum) platelet aggregation ($I_2$), and an amount of light transmitted through the mixture in the chamber prior to platelet aggregation ($I_1$). Accordingly, in equation (1), the unknowns are $I_1$ and $I_2$. These values are determined during PRU testing, as described above. The control system receives these values and solves for the platelet aggregation value using equation (1).

In equation (1), effects of the blood particles in the whole blood sample ($C_{base\_blood}$) are discounted or eliminated, resulting in a platelet aggregation value that is independent of, or substantially independent of, a hematocrit of the whole blood sample. That is, interference affecting the platelet aggregation value caused by blood particles in the whole blood sample or thickness of the whole blood sample can be removed or reduced using the calculation of equation (1).

Figure 13:
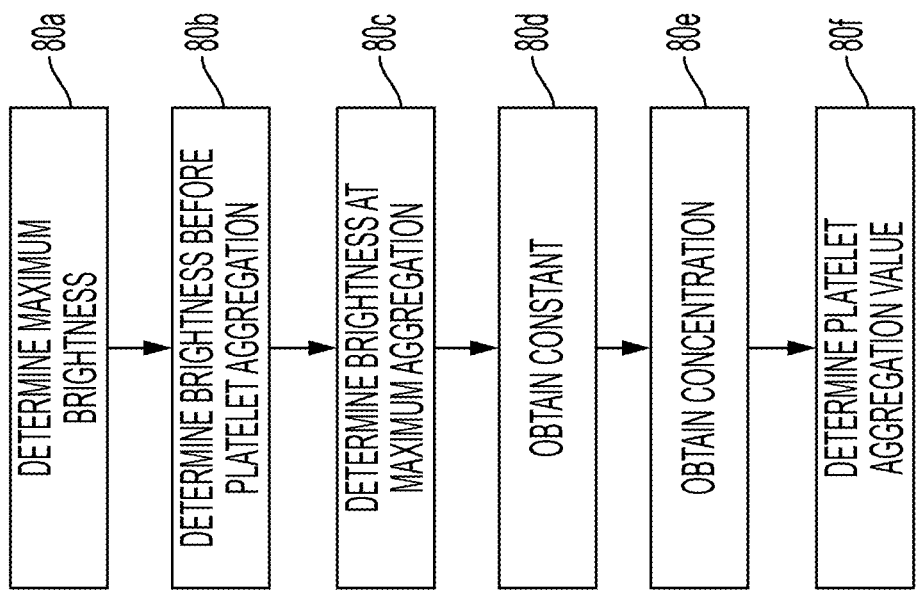
FIG. 13 is a flowchart showing an example process for determining a platelet aggregation value.

An example process 80 based on the Beer-Lambert law is shown in FIG. 13. As described above, a maximum brightness of light that can pass through the detection chamber is determined (80a). A brightness of light that passes through the mixture in the detection chamber before platelet aggregation begins (for example, at a beginning of a test) is determined (80b). A brightness of light that passes through the mixture in the detection chamber at a point of maximum aggregation (for example, at or near the end of a test) is determined (80c). Constant k is obtained (80e), for example, from computer memory. The concentration of the blood particles in the whole blood is obtained (80e), for example, based on measurements taken before testing or based on light transmitted through the detection chamber prior to testing. And, using these parameters, equation (1) is solved to determine (80f) a platelet aggregation value for the blood sample that is relieved of dependence on hematocrit of the blood sample.

In some implementations, the platelet aggregation values determined according to claim 1 may exhibit some dependence on hematocrit. Accordingly, hematocrit-based correction values of the type described herein may be applied to those platelet aggregation values to correct for any dependence on hematocrit.

The platelet aggregation value determined according to any of the processes described herein may be reported to a user. For example, the platelet aggregation value may be displayed on a display screen 70 of instrument 11, as shown in FIG. 1. For example, the platelet aggregation value may be output to a computing system 44, for example, over a computing network and displayed on a display screen of the computing system. The control system may use the platelet aggregation value to generate a plot or graph such as that shown in FIG. 9 to compare the platelet aggregation values to platelet aggregation values of other samples or subjects.

The control system described herein may be implemented using computing systems or any other appropriate computing device. The processes can be implemented, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processors executing one or more computer programs to perform the functions described herein. All or part of the processes can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random-access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
    a chamber to hold a mixture comprised of a whole blood sample from a patient;
    coated particles or pellets within the chamber, the coated particles or pellets to bind to platelet receptors in the whole blood sample to cause platelet aggregation in the mixture;
    a light source to illuminate the mixture in the chamber;
    a detector to detect light from the light source transmitted through the mixture in the chamber; and
    one or more processing devices to perform operations to determine, based on the light detected by the detector, a platelet aggregation value of the whole blood sample that is independent of a hematocrit of the whole blood sample, the operations comprising:
        determining an initial platelet aggregation value of the whole blood sample based on the light detected; and
        adjusting the initial platelet aggregation value based on a hematocrit-based correction value to produce the platelet aggregation value.

2. The system of claim 1, wherein the one or more processing devices are configured to adjust the initial platelet aggregation value by performing operations comprising:
    determining the hematocrit-based correction value based on a detected hematocrit or hematocrit-related value, the hematocrit-based correction value correcting for hematocrit dependence of the initial platelet aggregation value; and
    applying the hematocrit-based correction value to the initial platelet aggregation value.

3. The system of claim 2, wherein the system comprises a computer memory storing the hematocrit-based correction value, the hematocrit-based correction value being based on measurements of hematocrit or hematocrit-related values obtained from a same sample in a same chamber.

4. The system of claim 1, wherein the one or more processing devices are configured to determine the platelet aggregation value by performing operations comprising:
    determining a first brightness of light that passes through the chamber when no content is in the chamber based on light detected by the detector;
    determining a second brightness of light that passes through the mixture in the chamber before platelet aggregation begins based on light detected by the detector;
    determining a third brightness of light that passes through the mixture in the chamber at or near a completion of platelet aggregation based on light detected by the detector;
    obtaining a concentration of blood particles in the whole blood sample; and
    determining the platelet aggregation value based on an attenuation of light transmitted through the mixture in the chamber and the concentration of blood particles, the attenuation of the light being based on the first brightness, the second brightness, and the third brightness.

5. The system of claim 4, wherein a relationship between the platelet aggregation and hematocrit is a non-linear relationship; and
    wherein the one or more processing devices are configured to determine the platelet aggregation value based on the non-linear relationship between the hematocrit of the whole blood sample and the platelet aggregation of the whole blood sample.

6. The system of claim 4, wherein the one or more processing devices are configured to determine the platelet aggregation value based on the Beer-Lambert law.

7. The system of claim 1, further comprising:
    a cartridge comprising multiple chambers each to hold a mixture comprising a portion of the whole blood sample, the chamber being one of the multiple chambers;
    multiple light sources each associated with one of the multiple chambers, each light source to illuminate the mixture in the respective chamber that is based on the portion of the whole blood sample in the respective chamber, the light source being one of the multiple light sources; and
    multiple detectors each associated with one of the multiple chambers, each detector to detect light from the light source transmitted through the mixture in a respective chamber, the detector being one of the detectors;
    wherein the one or more processing devices are configured determine, based on the light detected by each of the multiple detectors, the platelet aggregation value for each portion of the whole blood sample that is independent of the hematocrit of the whole blood sample.

8. The system of claim 7, wherein the one or more processing devices are configured to control the multiple light sources to illuminate in an order such that a single chamber is illuminated at a time.

9. The system of claim 7, wherein the one or more processing devices are configured to determine a separate platelet aggregation value for each portion of the whole blood sample by performing operations comprising:
    determining an initial platelet aggregation value of each portion of the whole blood sample based on light detected; and
    adjusting the initial platelet aggregation value of a respective portion of the whole blood sample based on a respective hematocrit-based correction value to produce the platelet aggregation value of the respective portion of the whole blood sample.

10. The system of claim 9, wherein the one or more processing devices are configured to adjust the initial platelet aggregation value for each portion of the whole blood sample by performing operations comprising:

determining a hematocrit or hematocrit-related value associated with each portion of the whole blood sample based on light detected;

determining the hematocrit-based correction value based on the hematocrit or hematocrit-related value for a respective portion of the whole blood sample, the hematocrit-based correction value for the respective portion of the whole blood sample correcting for hematocrit dependence of the initial platelet aggregation value for the respective portion of the whole blood sample; and applying the hematocrit-based correction value to the initial platelet aggregation value for the respective portion of the whole blood sample.

11. The system of claim 1, further comprising:

a needle having a dual lumen to puncture a sample tube, each of the dual lumens being along a fluid path in a cartridge containing the chamber.

12. A method performed on a test instrument, comprising:

determining, for a whole blood sample in a chamber containing coated particles or pellets, a platelet aggregation value that is independent of a hematocrit of the whole blood sample, the coated particles or pellets to bind to platelet receptors in the whole blood sample to cause platelet aggregation of the whole blood sample in the chamber; and reporting the platelet aggregation value;

wherein determining the platelet aggregation value comprises:
    determining an initial platelet aggregation value of the whole blood sample based on light detected through the chamber; and
    adjusting the initial platelet aggregation value based on a hematocrit-based correction value to produce the platelet aggregation value.

13. The method of claim 12, wherein the method adjusts the initial platelet aggregation value by performing operations comprising:

determining a hematocrit or hematocrit-related value associated with the whole blood sample;

determining the hematocrit-based correction value based on the hematocrit or hematocrit-related value, the hematocrit-based correction value correcting for hematocrit dependence of the initial platelet aggregation value; and applying the hematocrit-based correction value to the initial platelet aggregation value;

wherein the hematocrit-based correction value is based on a measurements of hematocrit or hematocrit-related values obtained from a same sample.

14. The method of claim 12, wherein the method determines the platelet aggregation value by performing operations comprising:

determining a first brightness of light that passes through the chamber when no content is in the chamber;

determining a second brightness of light that passes through a mixture comprised of the whole blood sample in the chamber before platelet aggregation begins;

determining a third brightness of light that passes through the mixture in the chamber at or near a completion of platelet aggregation;

obtaining a concentration of blood particles in the whole blood sample; and determining the platelet aggregation value based on an attenuation of light transmitted through the mixture and the concentration of blood particles, the attenuation of the light being based on the first brightness, the second brightness, and the third brightness.

15. The method of claim 14, wherein a relationship between the platelet aggregation and hematocrit is a non-linear relationship;

wherein the method determines the platelet aggregation value based on the non-linear relationship between the hematocrit of the whole blood sample in the chamber and the platelet aggregation of the whole blood sample in the chamber; and wherein determining the platelet aggregation value is based on the Beer-Lambert law.

16. A system comprising:

a cartridge comprising multiple chambers, a chamber among the multiple chambers for holding a mixture comprising a whole blood sample to be tested for platelet aggregation, where there is a non-linear relationship between the platelet aggregation and hematocrit for the whole blood sample, and where the chamber contains coated particles or pellets to bind to platelet receptors in the whole blood sample to cause platelet aggregation; and means for determining, based on the mixture in the chamber, a platelet aggregation value for the whole blood sample, the platelet aggregation value being independent of the hematocrit of the whole blood sample;

wherein the means for determining is configured to determine the platelet aggregation value by performing operations comprising:
    determining an initial platelet aggregation value of the whole blood sample based on a light detected through the chamber; and
    adjusting the initial platelet aggregation value based on a hematocrit-based correction value to produce the platelet aggregation value.

17. The system of claim 16, wherein the means for determining comprises one or more processing devices configured to execute machine-readable instructions.

* * * * *